(12) United States Patent
Finkenzeller

(10) Patent No.: US 11,518,230 B2
(45) Date of Patent: Dec. 6, 2022

(54) CLUTCH DEVICE AND HYBRID MODULE

(71) Applicant: Schaeffler Technologies AG & Co. KG, Herzogenaurach (DE)

(72) Inventor: Marc Finkenzeller, Gengenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 518 days.

(21) Appl. No.: 16/476,326

(22) PCT Filed: Feb. 23, 2018

(86) PCT No.: PCT/DE2018/100163
§ 371 (c)(1),
(2) Date: Jul. 8, 2019

(87) PCT Pub. No.: WO2018/162001
PCT Pub. Date: Sep. 13, 2018

(65) Prior Publication Data
US 2022/0001735 A1 Jan. 6, 2022

(30) Foreign Application Priority Data
Mar. 7, 2017 (DE) .......................... 102017104743.3

(51) Int. Cl.
*F16D 13/54* (2006.01)
*F16D 23/12* (2006.01)
(Continued)

(52) U.S. Cl.
CPC .............. *B60K 6/387* (2013.01); *F16D 13/54* (2013.01); *F16D 23/12* (2013.01); *F16D 25/082* (2013.01); *F16D 2023/123* (2013.01)

(58) Field of Classification Search
CPC ......... B60K 6/387; F16D 13/54; F16D 23/12; F16D 25/082; F16D 2023/123; F16D 13/52
See application file for complete search history.

(56) References Cited

U.S. PATENT DOCUMENTS 10,781,869 B2 9/2020 Finkenzeller
2014/0353107 A1 12/2014 Hemphill

FOREIGN PATENT DOCUMENTS

CN 103987983 A 8/2014
DE 102012222110 A1 6/2013
(Continued)

OTHER PUBLICATIONS

Machine translation of WO 2017202408 A1 (Year: 2017).*

*Primary Examiner* — Stacey A Fluhart
*Assistant Examiner* — Farhana Pervin

(57) ABSTRACT

A clutch device includes a main clutch, a pilot clutch, and an inner cage. The main clutch has a friction pack, a pressure device for pressing the friction pack, and a ramp system for moving the pressure device. The pilot clutch is for transmitting torque to the ramp system and can be opened and closed by moving the counter-plate. The pressure device can be moved by the counter-plate. The friction pack is mechanically connected to the inner cage and an outer cage. The ramp system includes a first ramp element arranged on the inner cage, a freewheel, and a second ramp element. The freewheel blocks rotary movement of the first ramp element in a first rotational direction and allows rotary movement in an opposite rotational direction. The first and second ramp elements, and the pilot clutch, are mechanically connected to the inner cage when the pilot clutch is closed.

19 Claims, 2 Drawing Sheets

(51) Int. Cl.
*B60K 6/387* (2007.10)
*F16D 25/08* (2006.01)

(56) References Cited

FOREIGN PATENT DOCUMENTS

| | | | |
|---|---|---|---|
| DE | 102014225961 A | 6/2015 | |
| DE | 102015202039 A1 | 8/2016 | |
| WO | 2016165701 A1 | 10/2016 | |
| WO | WO-2016165712 A1 * | 10/2016 | ............. F16D 41/04 |
| WO | 2016184459 A1 | 11/2016 | |
| WO | 2017202408 A1 | 11/2017 | |

* cited by examiner

CLUTCH DEVICE AND HYBRID MODULE

CROSS-REFERENCE TO RELATED APPLICATIONS

This application is the United States National Phase of PCT Appln. No. PCT/DE2018/100163 filed Feb. 23, 2018, which claims priority to German Application No. DE102017104743.3 filed Mar. 7, 2017, the entire disclosures of which are incorporated by reference herein.

TECHNICAL FIELD

The disclosure relates to a clutch device and to a hybrid module having the clutch device according to the disclosure. The clutch device comprises a main clutch having a friction pack and a movable pressure device for applying a pressing force to the friction pack. The clutch device furthermore comprises a ramp system for moving the pressure device.

BACKGROUND

Particularly for implementing hybrid modules, which allow sequential or, alternatively, simultaneous operation of an internal combustion unit and an electric machine, use is made of specially configured clutch devices, by means of which the power made available by the internal combustion unit and/or the power made available by the electric machine can be transmitted to a drive train. For this purpose, clutch devices of this kind are often equipped with a pilot clutch and a main clutch. By actuating the pilot clutch, it is possible to produce a torque which serves to close or open the main clutch. In this case, a clutch device of this kind is intended to separate the internal combustion unit from the drive train with as little loss as possible during the operation of the electric machine. During the operation of the internal combustion unit, it should be possible to close the clutch. It should be possible to actuate the clutch device with a minimum of energy.

In this regard, DE 10 2012 222 110 A1 discloses a separating clutch for a hybrid drive. By means of the separating clutch, an internal combustion engine of a vehicle can be separated from and connected to an electric machine and a transmission input shaft of a vehicle transmission. In this case, the electric machine can be used as a starter for starting the internal combustion engine. For this purpose, the separating clutch is partially closed by an actuator. To actuate the separating clutch, a planetary transmission, a ramp system and an eddy current brake are used here. Moreover, a freewheel is used as a pilot element for producing a pressing force, by means of which the plate pack of the clutch is clamped. This freewheel allows automatic closure of the clutch, substantially without the supply of additional energy. The freewheel has the effect that the internal combustion engine cannot reach a speed higher than the electric machine or the drive train provided therewith.

In various operating situations of the vehicle, however, a higher speed of the internal combustion unit than the electric machine or the drive train is required. In particular, to minimize the pollutants produced by the operation of the internal combustion unit there is the need to make the internal combustion unit run at a relatively high speed to heat an exhaust gas catalytic converter before the internal combustion unit applies the actual driving power to the drive train.

Another requirement on clutch devices for arrangement in hybrid modules is, of course, high performance in respect of the torque to be transmitted. Moreover, particularly during the process of starting the internal combustion unit by means of the electric machine, there is a requirement to enable control of the torque to be transmitted to the internal combustion unit by the electric machine.

Energy-efficient closure of a torque path between an electric machine and the internal combustion unit for the purpose of starting the internal combustion unit should likewise be possible, as should a "coasting mode", in which the kinetic energy of a vehicle fitted with the hybrid module is not transmitted to the internal combustion unit, as well as an engine brake, in which the rotary motion of the motor vehicle wheels is transmitted to the internal combustion unit in order to use the friction of said unit to produce a braking effect.

SUMMARY

The clutch device according to the disclosure comprises a main clutch, which can be a dry or wet clutch of single-disk or multi-disk design. This main clutch has a friction pack and a movable pressure device, designed as a pressure pot, for example, for producing a pressing force on the friction pack. Moreover, the clutch device furthermore comprises a ramp system for moving the pressure device in order to apply a force to the friction pack. The clutch device furthermore has a pilot clutch for the purpose of transmitting torque to the ramp system. The pilot clutch comprises a counter-plate and an actuating device for moving the counter-plate. The pilot clutch can be opened and closed by moving the counter-plate. The counter-plate can be moved to such an extent that it can apply a force to the pressure device and in this way can move the pressure device.

The clutch device furthermore has an inner cage and an outer cage, wherein the friction pack is mechanically connected to the inner cage and the outer cage. The ramp system comprises a ramp element arranged on the inner cage and a ramp element which is rotatable relative thereto, wherein, when the pilot clutch is closed, the rotatable ramp element and the pilot clutch are mechanically connected to the inner cage and the outer cage. The ramp element arranged on the inner cage is connected to the inner cage by means of a freewheel, which blocks a rotary movement of the ramp element in relation to the inner cage in one direction of rotation and allows rotary movement counter to said direction of rotation.

The friction clutch is designed to transmit a torque from an output shaft to a load and vice versa. The pressure device applies a pressing force to the friction pack in order in this way to compress the plates of the friction pack and thus close the main clutch, allowing said clutch to transmit a torque from an internal combustion unit to a drive train.

The pressure device is mechanically coupled to the ramp system. The torque produced by an internal combustion unit is transmitted to the ramp system by means of the pilot clutch. The pilot clutch is opened and closed by the movement of the counter-plate, making it possible in this way to control whether or not a torque is transmitted from an internal combustion unit to the ramp system via the pilot clutch. The second function of the counter-plate is to exert a force on the pressure device, directly and preferably immediately, when the counter-plate is moved, thus enabling the main clutch to be closed by this means too.

In this context, the freewheel mentioned should be taken to mean a clutch device which acts in only one direction of rotation and which can transmit the rotary motion of the ramp element to the inner cage but cannot transmit a rotary motion or a torque from the inner cage to the connected ramp element in the same direction of rotation. Here, the direction of rotation in which the freewheel can transmit the torque or rotary motion of the ramp element to the inner cage is the direction of rotation of an internal combustion unit to be connected to the clutch device or that of an electric drive unit to be connected to the inner cage, e.g. an electric motor.

The ramp element arranged on the inner cage and the rotatable ramp element are configured in such a way here that the rotatable ramp element moves away from the ramp element arranged on the inner cage during a rotary motion owing to obliquely arranged ramps or moves towards said ramp element.

The embodiment of the clutch device with the freewheel allows for the possibility in this way of implementing a traction mode in a simple manner, in which the connected internal combustion unit applies a torque to the outer cage of the main clutch and, with the actuation of the pilot clutch, this rotary motion or torque is transmitted to the ramp system, which moves the pressure pot of the main clutch and thus closes the main clutch and, in this way, connects the inner cage of the main clutch non-positively to the outer cage of the main clutch. Owing to the locking effect of the freewheel, the rotatable ramp element can, in this case, be rotated in relation to the ramp element connected to the inner cage, with the result that the two ramp elements move axially away from each other.

However, if there is a requirement to implement a "coasting mode" or even a functional state in which the output side or inner cage of the clutch device is rotating more quickly than the outer cage or an internal combustion unit connected thereto, as may occur, for example, when a motor vehicle is traveling downhill, the freewheel releases the connection for conjoint rotation between the inner cage and the ramp element, thus enabling the inner cage to rotate more quickly than the ramp element connected thereto and the pilot clutch coupled therewith. This has the advantage that, to achieve an operating state of this kind, there is no need to expend additional energy, e.g. that required to open the pilot clutch to actively open a torque path.

Another advantage of the clutch device according to the disclosure is that it is possible to transmit a force to the pressure device in a controllable manner by means of the counter-plate while using a small number of technical means and taking up only a small installation volume, thus enabling a torque produced by an electric machine, for example, to be introduced into the main clutch, thereby allowing the internal combustion unit to be started by means of the torque made available by the electric machine. The technical means for implementing this starting process, namely the counter-plate and the pressure device, thus have a dual function, namely that of transmitting a torque from the internal combustion unit to a drive train and the described function of passing a torque from the electric machine to the internal combustion unit, in order to start the latter, for example. Consequently, fewer construction elements and also less installation space are required in comparison with conventional embodiments in hybrid modules.

The clutch device may be implemented in such a way that the force that can be applied by the counter-plate to the pressure device can be exerted directly on the pressure device. This means that, in this embodiment of the clutch device, the counter-plate can be pressed against the pressure device in order to move the latter. At the same time, however, there is no intention by the invention to exclude the presence of thin intermediate layers between the counter-plate and the pressure device, e.g. paint layers or other coatings.

In an example embodiment of the clutch device, provision is furthermore made for the pilot clutch to have spring devices, in particularly leaf springs. These spring devices can be used to define the forces acting in the pilot clutch.

The actuating device for moving the counter-plate may include a plurality of pressure pins, which act on the counter-plate. The counter-plate can be moved by means of the pressure pins through the application of tension and compression forces. Thus, the actuating device comprises at least one mechanical release mechanism, which can be operated electromechanically or hydraulically or even pneumatically. The movement of the pressure pins may be implemented by at least one hydraulic drive, which is mechanically coupled to the pressure pins.

A friction disk of the pilot clutch is permanently connected to the outer cage. However, it is only when the pilot clutch is closed that the pilot clutch is connected fully to the outer cage. Rolling elements, e.g., balls, can be arranged between the two ramp elements. The ramp surfaces mentioned can then form races for the rolling elements. The ramp surfaces may be arranged on the circumference of the ramp elements.

To support the inner cage, which is subjected to an axial load by the actuating device, provision is preferably made for the inner cage to be supported parallel to the axis of rotation of the clutch device on at least one support bearing. This support bearing preferably forms a shoulder, making it suitable for absorbing the axial forces. For the absorption of the prevailing forces, an axial bearing may be arranged between the ramp system, in particular between the rotatable ramp element, and the pressure device. This axial bearing too serves to absorb forces acting axially, i.e. parallel to the axis of rotation. In a simple embodiment, the pressure pins of the actuating device may be supported movably in the rotatable ramp element.

The clutch device thereby made available can be used, for example, as a separating clutch for a hybrid drive of a hybrid vehicle. The pilot clutch used can be actuated sequentially by an actuator in the form of pressure pins and a hydraulic device, for example. The pilot clutch can thereby be opened to separate the internal combustion unit from an electric machine. In this case, the ramp system becomes substantially load-free, allowing the rotatable ramp element to rotate relative to the ramp element arranged on the inner cage and to move axially in such a way that the pressure device operatively connected thereto removes the pressing force on the friction pack of the main clutch. The main clutch is thereby opened.

To start the internal combustion unit using the electric machine, the actuating device is once again used to exert a pressure directly on the pressure device. This leads to the closure of the main clutch and consequently once again to the closing of the torque transmission path between the internal combustion unit and the drive train. After renewed actuation of the actuating device, said device closes the pilot clutch, with the result that the torque made available by the internal combustion unit is transmitted via the pilot clutch to the ramp system, once again causing the rotatable ramp element to rotate and, in this way, to move further away from the fixedly arranged ramp element. During this process, the rotatable ramp element moves the pressure device in such a way that said device in turn compresses the friction pack of the main clutch. Consequently, the torque of the internal combustion unit is used to implement the transmission of this torque to the drive train.

Other example embodiments may comprise a hybrid module with a first drive unit, in the form of an internal combustion engine or internal combustion unit, for example, with an output shaft. The hybrid module furthermore comprises a drive train with a second drive unit mechanically coupled thereto, e.g., an electric machine. The hybrid module comprises the clutch device according to the disclosure, and the output shaft of the first drive unit is releasably connectable to the drive train by means of the clutch device for the purpose of torque transmission.

The internal combustion engine or internal combustion unit, the clutch device, the electric machine and a transmission unit can be arranged in the stated sequence in the hybrid module. The hybrid module can furthermore have a torsional vibration damper, e.g., a dual mass flywheel. The torsional vibration damper can have an energy storage device. By means of the clutch device according to the disclosure of the hybrid module, the internal combustion unit can be coupled to the drive train or decoupled from the drive train in an energy-efficient manner.

BRIEF DESCRIPTION OF THE DRAWINGS

The disclosure described above is explained in detail below in relation to the relevant technical background, with reference to the associated drawings, which show preferred embodiments. The disclosure is not in any way restricted by the purely schematic drawings, and it should be noted that the illustrative embodiments shown in the drawings are not restricted to the dimensions illustrated.

In the drawings.

DETAILED DESCRIPTION

Figure 1:
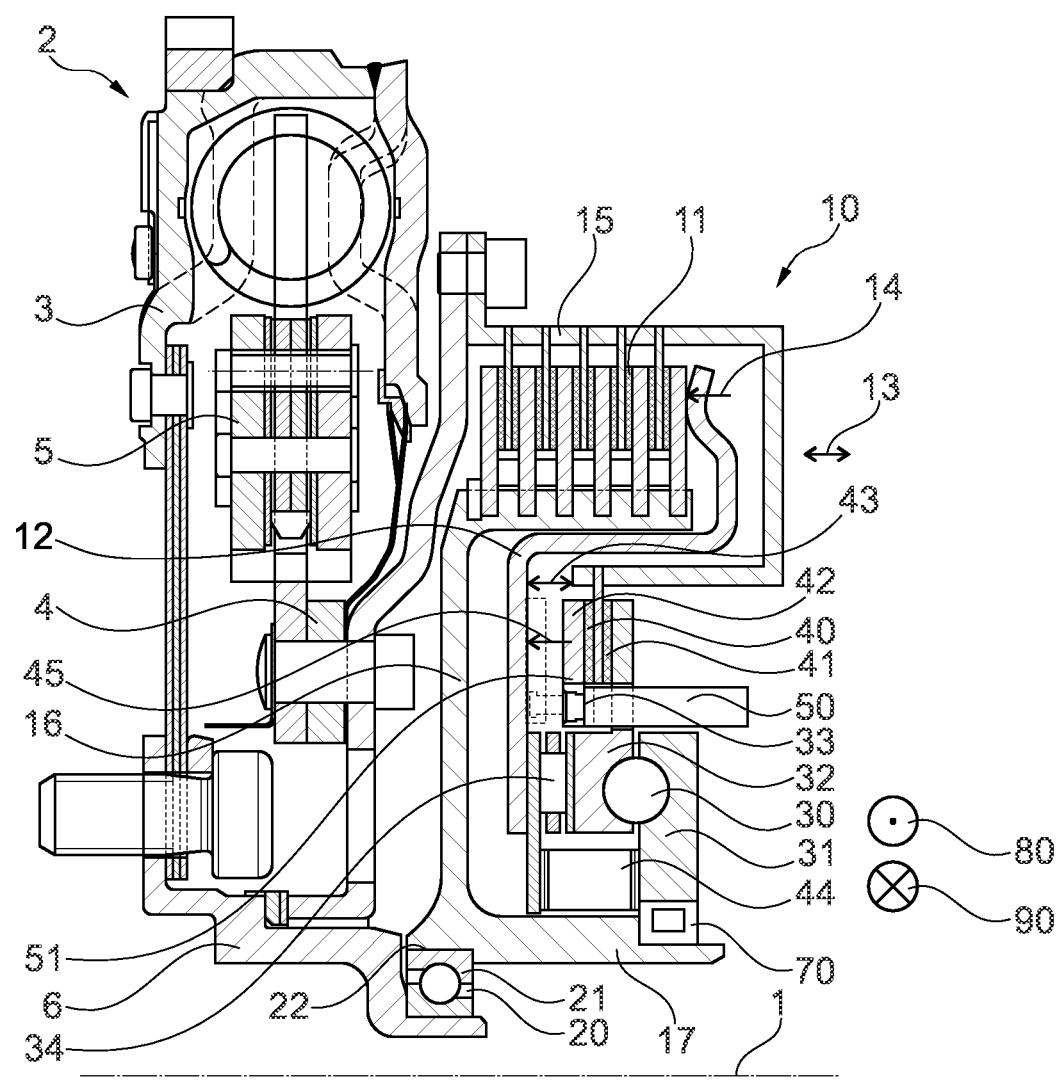
FIG. 1 shows a hybrid module according to the disclosure having the clutch device according to the disclosure in section.

The hybrid module illustrated in section in FIG. 1 has a dual mass flywheel 2, which is connected to a centrifugal pendulum 5. The dual mass flywheel 2 and the centrifugal pendulum 5 are connected in a torsionally rigid manner to an output shaft 6 via a primary side 3 of the dual mass flywheel 2. The output shaft 6 rotates about an axis of rotation 1, which simultaneously forms the axis of rotation of the entire hybrid module. The secondary side 4 of the dual mass flywheel 2 is connected firmly by mechanical means to an outer cage 15 of a main clutch 10. This main clutch 10 comprises a friction pack 11, the plates of which are connected alternately to the outer cage 15 and the inner cage 16. The inner cage 16 forms a hub 17, which is likewise rotatable about the axis of rotation 1.

Another component part of the main clutch 10 is a pressure device 12, which is here designed as a pressure pot. The pressure device 12 can be moved along the direction of movement 13. By appropriate movement of the pressure device 12, said device can be pressed onto the friction pack 11 with a pressing force 14 in order in this way to close the main clutch 10. The inner cage 16 is supported via its hub 17 on a support bearing 20, which forms a shoulder 21 to enable axially acting forces to be absorbed.

The hybrid module furthermore comprises a ramp system 30, which comprises a fixed ramp element 31, arranged by means of a freewheel 70 on the hub 17, and a ramp element 32, which can be rotated relative to said fixed ramp element. A plurality of balls is arranged between the ramp elements 31, 32. The ramp elements 31, 32 are embodied with obliquely extending ramp surfaces (not illustrated specifically here), on which the balls run.

Owing to the fact that the obliquely extending ramp surfaces rest against one another, rotation of the rotatable ramp element 32 brings about a change in the distance from the ramp element 31 arranged on the hub 17 or inner cage 16. The rotatable ramp element 32 is supported on an axial bearing 34, which is supported in the axial direction on the pressure device 12. To set the forces in the ramp system 30, leaf springs 44 are furthermore arranged between the ramp element 31 arranged on the hub 17 or inner cage 16 and the pressure device 12 that can be moved by means of the ramp system 30.

One section of the rotatable ramp element 32 forms part of the pilot clutch 40. In addition to said section of the rotatable ramp element 32, this pilot clutch 40 furthermore comprises a friction disk 41 and a counter-plate 42, which can be moved parallel to the axis of rotation 1 and consequently can act on the friction disk 41 between itself and the rotatable ramp element 32 with a frictional force such that a torque can be transmitted from the friction disk 41 to the rotatable ramp element 32 and vice versa. For this purpose, the actuating device 50 in the form of the illustrated pressure pins, which can be coupled to a hydraulic, electric or even pneumatic drive unit (not visible here), is actuated in such a way that the counter-plate 42 is pulled in the direction of the rotatable ramp element 32. In this case, the pressure pins of the actuating device 50 are integrated into a translational bearing assembly 51 in the rotatable ramp element 32.

When the pilot clutch 40 is closed, it is possible in this way for a torque introduced into the output shaft 6 to be input into the friction pack 11 of the main clutch 10 via the outer cage 15. By virtue of the torque transmission by the pilot clutch 40 into the ramp system 30, the rotatable ramp element 32 is rotated in such a way that the distance relative to the ramp element 31 arranged on the hub 17 or inner cage 16 increases. The pressure device 12 is thereby moved to the left, with the result that it applies the pressing force 14 to the friction pack 11 and, as a result, the main clutch 10 is closed and the torque is transmitted from the output shaft 6 to the inner cage 16 or hub 17.

If the pilot clutch 40 is opened by actuation of the actuating device 50, the torque path via the pilot clutch 40 is interrupted, with the result that the ramp system 30 is substantially load-free and the rotatable ramp element 32 moves back to the right owing to the action of leaf springs 44 between the pressure device 12 and the ramp element 31 arranged on the hub 17 or inner cage 16, as a result of which the pressing force 14 on the friction pack 11 is also canceled. Consequently, the main clutch 10 is opened and torque transmission from the output shaft 6 to the inner cage 16 is interrupted.

With the operation of an electric drive (not illustrated here) connected to the inner cage 16 and with the aim of using the electric drive to start an internal combustion unit coupled to the output shaft 6, the procedure is as follows: the actuating device 50 is actuated in such a way that the illustrated pressure pins move the counter-plate 42 to the left into the position illustrated in broken lines, with the result that the counter-plate 42 rests against the pressure device 12 and moves the latter likewise to the left, ensuring that it once again exerts a pressing force 14 on the friction pack 11 of the main clutch 10. A torque introduced into the inner cage 16 by an electric drive is thus input into the friction pack 11 of the main clutch 10 and transmitted by the latter to the dual mass flywheel 2 and consequently also to the output shaft 6, with the result that an internal combustion unit (not illustrated here) connected to the output shaft 6 can be supplied with kinetic energy and started. When stable independent running of the internal combustion unit is achieved, the actuating device 50 is actuated again, with the result that the force 45 exerted by said device is removed and the pressure device 12 is once again moved to the right and the main clutch 10 is opened.

If the actuating device 50 continues to be actuated in the manner already described in order to close the pilot clutch 40, the torque introduced by the output shaft 6 is used to actuate the ramp system 30 and, in this way, to move the pressure device 12 to the left again, with the result that it once again exerts the pressing force 14 on the friction pack 11 of the main clutch 10 and thus closes this main clutch 10, with the result that the torque made available by the output shaft 6 is transmitted into the inner cage 16. During this process, the axial force applied by the actuating device 50 is absorbed by the support bearing 20, which applies a corresponding opposing supporting force 42 to the hub 17. To set the forces prevailing in the pilot clutch 40, said clutch has leaf springs, in particular between the counter-plate 42 and the friction disk 41.

By means of the clutch device according to the disclosure and the hybrid module according to the disclosure, an internal combustion unit can be coupled in an energy-efficient manner to a drive train in the unactuated state of the pilot clutch 40, both during the application of a torque and in the driven state. In this case, the torque transmitted by the pilot clutch 40 is converted by the ramp system 30 into an axial force, by means of which the friction pack 11 of the main clutch 10 is clamped. The axial force generated by the ramp system 30 is absorbed by the hub 17, thus ensuring that a connected internal combustion unit is not subjected to axial loads. Irrespective of the direction of transmission of a torque, a single actuating device 50 acts on the pressure pins in order to move the counter-plate 42.

By virtue of its locking effect in direction of rotation 80, the freewheel 70 arranged between the inner cage 16 and ramp element 31 enables the rotatable ramp element to be rotated in relation to the ramp element connected to the inner cage, resulting in an increase in an axial distance between the two ramp elements 31, 32. However, the freewheel 70 can also be used to implement a "coasting mode" or even a functional state in which the output side or inner cage 16 of the clutch device is rotating more quickly than the outer cage 15 or an internal combustion unit connected thereto, as may occur, for example, when a motor vehicle equipped therewith is traveling downhill. In this case, a rotary motion of the ramp element 31 relative to the inner cage 16 takes place in the opposite direction of rotation 90 and, as a consequence, the connection for conjoint rotation between the inner cage 16 and ramp element 31 is released by the freewheel 70, with the result that the inner cage 16 can rotate more quickly than the ramp element 31 connected thereto and the pilot clutch 40 coupled therewith. Therefore, to achieve an operating state of this kind, there is no need to expend additional energy to actively open a torque path.

Figure 2:
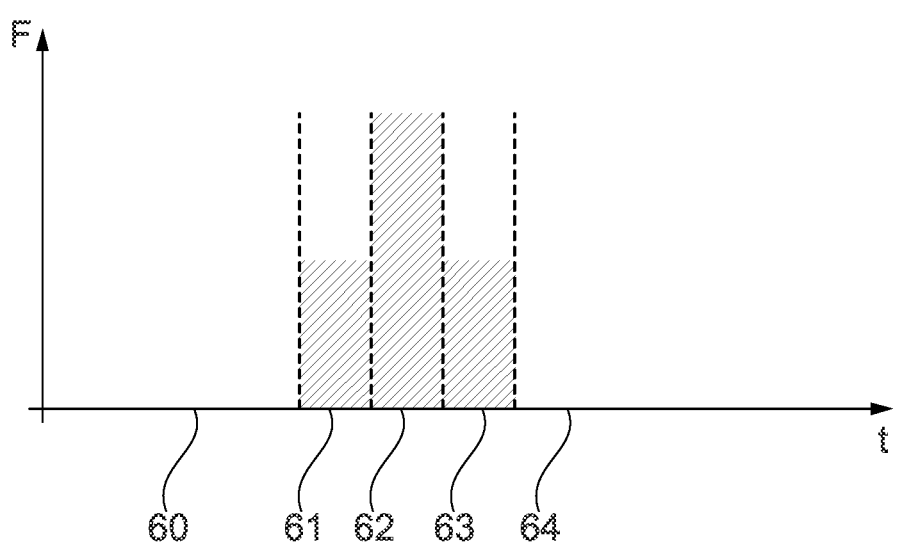
FIG. 2 shows a force-displacement diagram illustrating the required force when actuating the pilot clutch.

The force or energy required to implement the individual states of the hybrid module is illustrated by means of the diagram in FIG. 2. When the pilot clutch 14 is closed for the purpose of torque transmission between the output shaft 6 and the inner cage 16, the illustrated state 60 shows that no force and consequently no energy at all has to be expended.

To open the pilot clutch 40 to interrupt the torque flow, a corresponding force and, consequently, energy has to be expended. This state is indicated by section 61. To apply the force 45 that has to be applied to the pressure device 12 by the counter-plate 42, the actuating device 50 must be actuated with a relatively high force and, consequently, high energy. This state is indicated by section 62.

Once stable independent running of a connected internal combustion unit has been produced, the counter-plate 42 has to be separated again from the pressure device 12, during which process the force 45 applied to the pressure device 12 by the counter-plate 42 is also reduced, with the result, in turn, that less energy is required. This state is indicated by section 63.

After subsequent closure of the pilot clutch by means of the actuating device 50, additional force or energy is once again no longer required for torque transmission since, as already described, the torque produced by the internal combustion unit itself brings about the closure of the main clutch 10 via the ramp system 30. This state is indicated by section 64.

By means of the clutch device proposed here and by means of the hybrid module, a torque produced by an internal combustion unit can be transmitted in a reliable manner to an output or a drive train and vice versa, wherein it is ensured that an internal combustion unit connected to the clutch device can be operated in an energy-efficient manner at a higher speed than a coupled electric machine, thus enabling a controllable starting process of the internal combustion unit to be carried out by means of the electric machine and enabling speed-independent operation of the internal combustion unit to be carried out.

REFERENCE NUMERALS 1 axis of rotation
2 dual mass flywheel
3 primary side
4 secondary side
5 centrifugal pendulum
6 output shaft
10 main clutch
11 friction packs
12 pressure device
13 direction of movement
14 pressing force
15 outer cage
16 inner cage
17 hub
20 support bearing
21 shoulder
22 supporting force
30 ramp system
31 ramp element
32 rotatable ramp element
33 leaf springs
34 axial bearing
40 pilot clutch
41 friction disk
42 counter-plate
43 movement of the counter-plate
44 leaf springs
45 force of the counter-plate
50 actuating device
51 bearing assembly
60 closed state of pilot clutch
61 open state of pilot clutch 62 closed state of pilot clutch
63 open state of pilot clutch
64 closed state of pilot clutch
70 freewheel
80 direction of rotation
90 opposite direction of rotation

The invention claimed is:
1. A clutch device comprising:
a main clutch comprising:
  a friction pack;
  a movable pressure device for producing a pressing force on the friction pack;
  a ramp system for moving the movable pressure device; and
  an axial bearing between the ramp system and the movable pressure device;
a pilot clutch for transmitting torque to the ramp system, comprising:
  a counter-plate; and
  an actuating device for moving the counter-plate; and
an inner cage; and
an outer cage, wherein:
  the pilot clutch can be opened and closed by moving the counter-plate;
  the movable pressure device can be moved by a force exerted on the movable pressure device by the counter-plate;
  the friction pack is mechanically connected to the inner cage and the outer cage;
  the ramp system comprises:
    a first ramp element arranged on the inner cage;
    a freewheel that:
      connects the first ramp element to the inner cage;
      blocks rotary movement of the first ramp element relative to the inner cage in a first rotational direction; and
      allows rotary movement of the first ramp element relative to the inner cage in a second rotational direction, opposite the first rotational direction; and
    a second ramp element rotatable relative to the first ramp element; and
  the first ramp element, the second ramp element, and the pilot clutch are mechanically connected to the inner cage and the outer cage when the pilot clutch is closed.
2. The clutch device of claim 1, wherein the force can be exerted directly on the movable pressure device.
3. The clutch device of claim 1, wherein the pilot clutch comprises leaf springs.
4. The clutch device of claim 1, wherein the actuating device comprises a plurality of pressure pins, which act on the counter-plate.
5. The clutch device of claim 4, wherein the actuating device comprises a hydraulic drive mechanically coupled to the pressure pins.
6. The clutch device of claim 4, wherein the pressure pins are movably supported in the second ramp element.
7. The clutch device of claim 1, wherein the freewheel is arranged radially between the inner cage and the first ramp element.
8. The clutch device of claim 7, wherein the inner cage is supported on a support bearing parallel to an axis of rotation of the clutch device.
9. A hybrid module comprising:
an internal combustion engine comprising an output shaft;
a drive train comprising an electric machine mechanically coupled thereto; and
the clutch device of claim 1, wherein the output shaft is releasably connectable to the drive train by means of the clutch device for torque transmission.
10. A clutch device comprising:
a main clutch comprising:
  an outer cage;
  an inner cage;
  a friction pack comprising a plurality of friction plates each drivingly connected to one of the outer cage or the inner cage; and
  a movable pressure device for pressing the plurality of friction plates together to close the main clutch; and
a pilot clutch comprising:
  a friction disk rotationally fixed to the outer cage; and
  a counter-plate arranged to:
    apply a first force to the movable pressure device in a first axial direction to engage the main clutch; or
    apply a second force to the friction disk in a second axial direction, opposite the first axial direction, to close the pilot clutch.
11. The clutch device of claim 10 wherein the pilot clutch comprises leaf springs arranged to close the pilot clutch.
12. The clutch device of claim 10 further comprising a plurality of pressure pins arranged to displace the counter-plate to apply the first force or the second force.
13. The clutch device of claim 10 wherein the friction disk is disposed axially between the counter-plate and the second ramp element.
14. The clutch device of claim 10 wherein the freewheel is arranged radially between the inner cage and the first ramp element.
15. The clutch device of claim 10 further comprising an axial bearing arranged axially between the second ramp element and the movable pressure device.
16. The clutch device of claim 10 further comprising a plurality of pressure pins movably supported in the second ramp element and arranged to displace the counter-plate to apply the first force or the second force.
17. The clutch device of claim 16 further comprising a hydraulic drive mechanically coupled to the pressure pins.
18. The clutch device of claim 10 wherein the pilot clutch further comprises:
a ramp system comprising:
  a first ramp element connected to the inner cage by a freewheel that blocks rotary movement of the first ramp element relative to the inner cage in a first rotational direction and allows rotary movement of the first ramp element in a second rotational direction, opposite the first rotational direction; and,
  a second ramp element rotatable relative to the first ramp element and arranged to apply a third force, greater than the first force, to the movable pressure device in the first axial direction to engage the main clutch when the pilot clutch is closed.
19. A clutch device comprising:
a main clutch comprising:
  a friction pack;
  a movable pressure device for producing a pressing force on the friction pack; and
  a ramp system for moving the movable pressure device;
a pilot clutch for transmitting torque to the ramp system, comprising:
  a counter-plate; and
  an actuating device for moving the counter-plate; and
an inner cage; and an outer cage, wherein:
- the pilot clutch can be closed by moving the counter-plate in a first axial direction;
- the movable pressure device can be moved by a force exerted on the movable pressure device by moving the counter-plate in a second axial direction, opposite the first axial direction;
- the friction pack is mechanically connected to the inner cage and the outer cage;
- the ramp system comprises:
  - a first ramp element arranged on the inner cage;
  - a freewheel that:
    - contacts the first ramp element and the inner cage;
    - blocks rotary movement of the first ramp element relative to the inner cage in a first rotational direction; and
    - allows rotary movement of the first ramp element relative to the inner cage in a second rotational direction, opposite the first rotational direction; and
  - a second ramp element rotationally fixed to the counter-plate and rotatable relative to the first ramp element; and
- the first ramp element, the second ramp element, and the pilot clutch are mechanically connected to the inner cage and the outer cage when the pilot clutch is closed.

\* \* \* \* \*